March 18, 1941.  E. R. NEEPER  2,235,328
SAFETY DEVICE FOR VEHICLES
Filed July 19, 1938  3 Sheets-Sheet 2
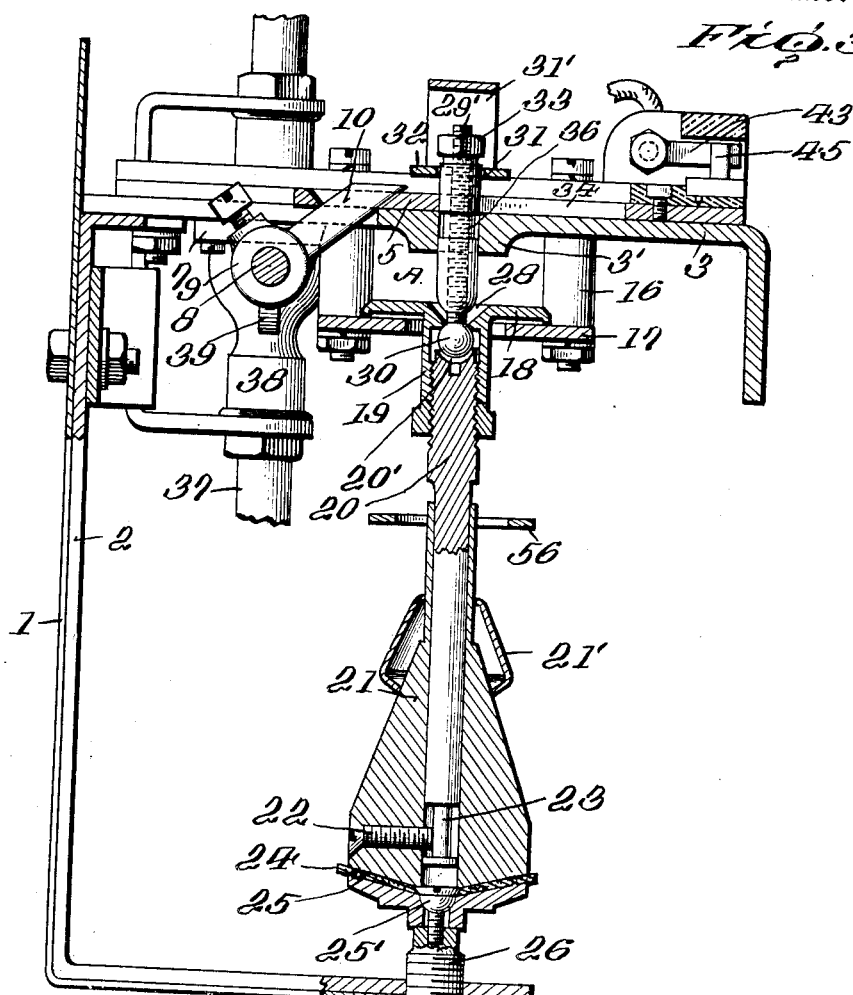
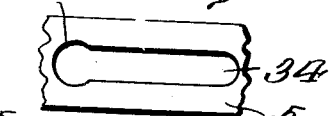
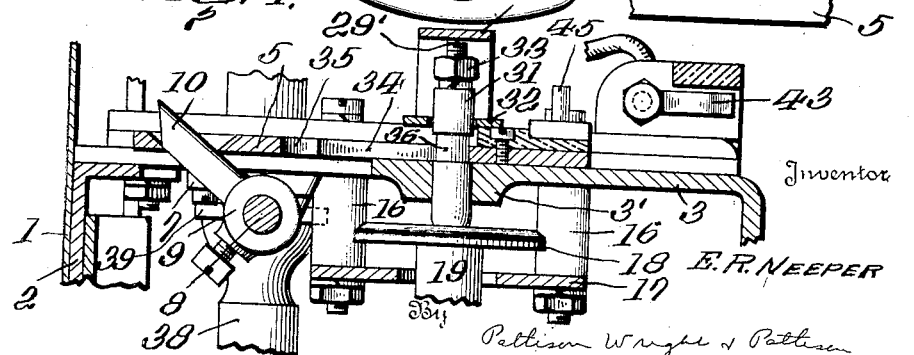
Inventor
E. R. NEEPER
By Pattison Wright & Pattison
Attorneys

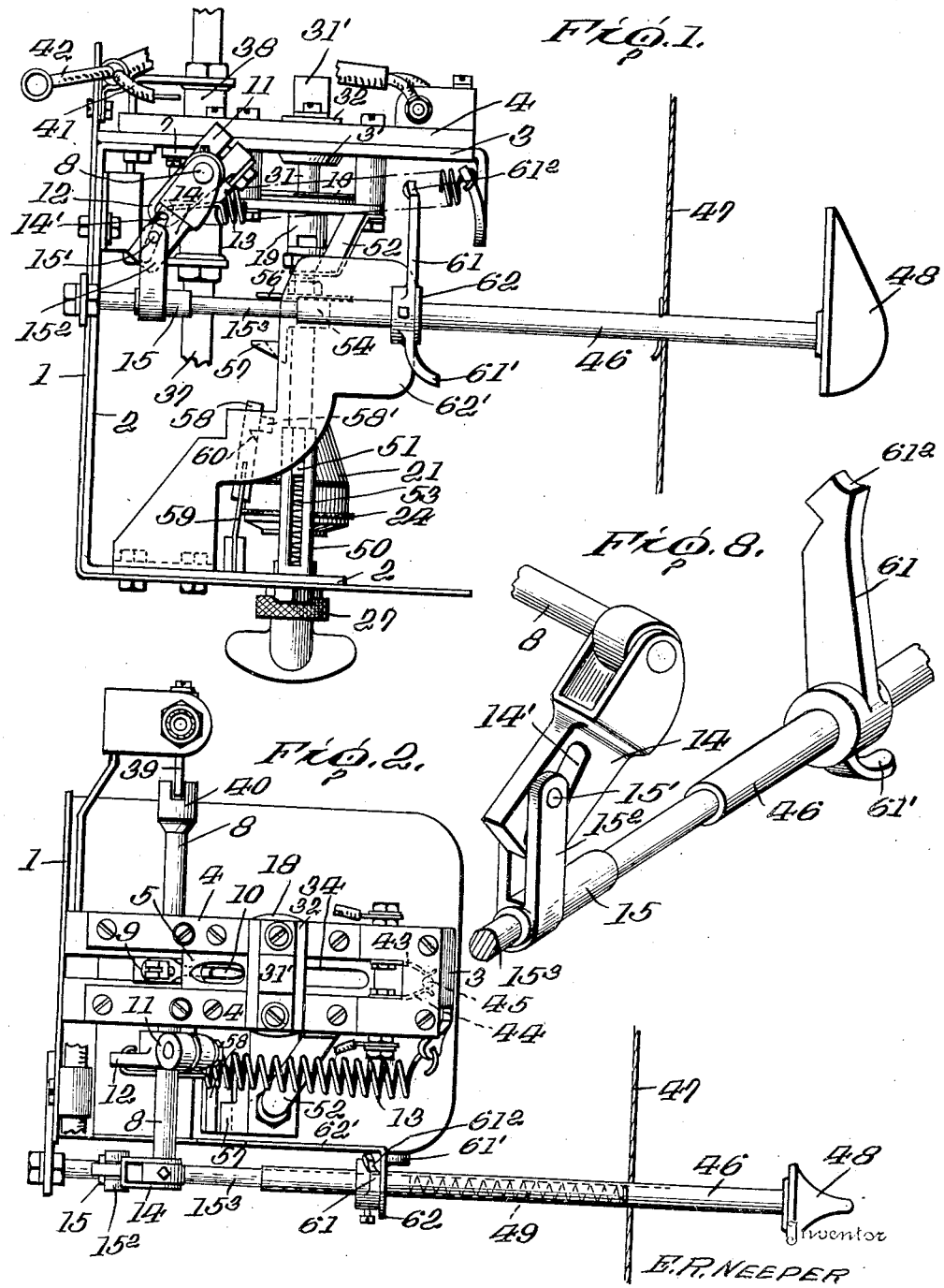

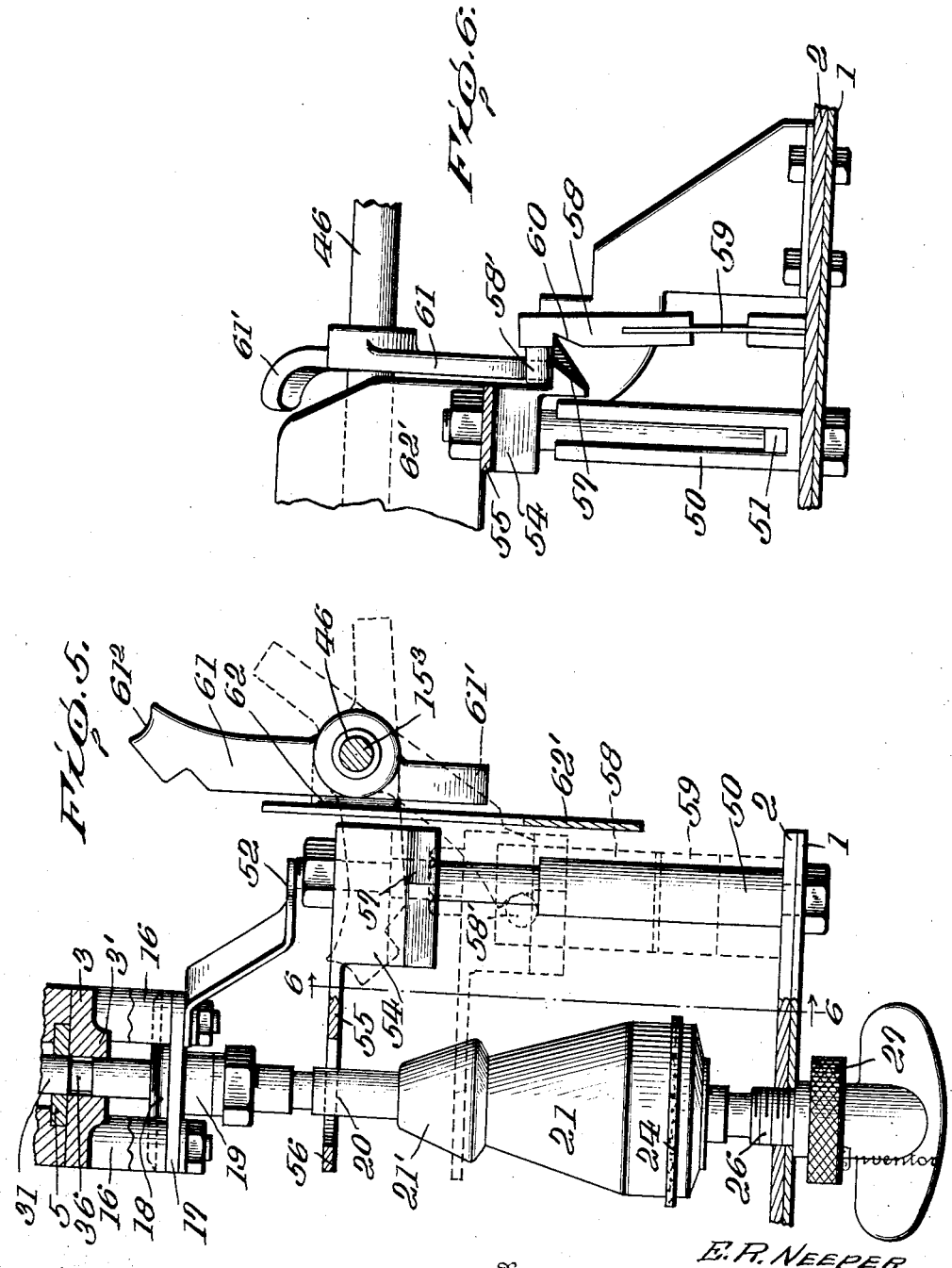

Patented Mar. 18, 1941

2,235,328

UNITED STATES PATENT OFFICE 2,235,328

SAFETY DEVICE FOR VEHICLES

Edward R. Neeper, Colorado Springs, Colo.

Application July 19, 1938, Serial No. 220,153

13 Claims. (Cl. 74—2)

This invention relates to certain new and useful improvements in a safety device for motor vehicles and more particularly to a safety device adapted to be used in connection with an internal combustion engine driven vehicle, such as motor vehicles, air planes and the like, the object being to provide a device which will cut off the supply of electrical energy at the source of supply (battery) and the source of fuel (tank) to the engine in case of an accident so as to prevent the vehicle from catching on fire.

Another object of my invention is to provide a device which is exceedingly simple and cheap in construction and one in which stored up energy is utilized for cutting off the electrical energy and the fuel supply when released by the turning over of the vehicle or abnormal tilting or a sudden abnormal shock.

A further object of my invention is to provide a device which can be adjusted so that the device can be set to operate when the vehicle tilts at any predetermined angle or is subjected to any predetermined shock.

Another object of my invention is to provide means for locking the spring-actuated member in set position to prevent the same from operating in order to enable the device to be used on airplanes for stunt flying.

A further object of my invention is to provide a device which can be readily reset after it has been operated by simply operating a lever irrespective of the position of the vehicle.

A still further object of my invention is to provide a device which is so constructed that it can be attached to the vehicle at any desired point and have control levers arranged on the instrument board or dash of the vehicle as the case may be to enable the same to be reset and locked by the operator of the vehicle when desired.

Other and further objects and advantages of the invention will be hereinafter set forth and the novel features thereof defined by the appended claims.

In the drawings,

Figure 1 is a side elevation of my improved construction of safety device;

Figure 2 is a top plan view;

Figure 3 is an enlarged vertical section, partly in elevation;

Figure 4 is an enlarged side elevation of the upper portion of the device showing the locking pin tripped by the swinging of the pendulum;

Figure 5 is a detail elevation showing the resetting and locking device;

Figure 6 is a detail elevation at right angles to Figure 5 showing the resetting and locking device;

Figure 7 is a detail top plan view of a portion of the spring actuated member showing a slot through which the locking pin passes; and, Figure 8 is a detail perspective view of the operating member showing the operating arm for resetting the device and for locking the device.

In the embodiment of my invention as herein shown I employ a bracket formed of sections 1 and 2, the section 1 being provided with a horizontally disposed member 3 having guide members 4 to form a guideway in which is mounted a spring-actuated member 5. The bracket is adapted to be supported by any suitable means on a motor vehicle so that the bottom of the bracket will be in a horizontal plane.

The member 3 is provided with suitable bearings 7 in which is mounted a shaft 8 carrying a collar 9 provided with an arm 10 which extends through a suitable opening formed in the spring-actuated member 5, said shaft 8 carrying a collar 11 provided with an arm 12 to which one end of a coil spring 13 is connected, the other being connected to the depending portion of the member 3 as clearly shown whereby the oscillation of the arm will have a tendency to move the spring-actuated member in one direction when released.

The shaft 8 carries an operating arm 14 by means of which the shaft is oscillated so as to reset the spring-actuated member as will be hereinafter fully described. It will be noted in this construction that the member 5 is actuated on by the spring 13 through the medium of the shaft and arm 10. The arm 14 is provided with a slot 14' in which travels a pin 15' extending across the furcations of a bifurcated arm $15^2$ carried by a sleeve 15 slidably mounted on a horizontally disposed rod $15^3$ carried by the section 1 of the bracket. When the sleeve is moved in one direction, the arm can be rocked so as to place the spring under tension and when so placed, the member 5 is also placed under tension and will be held in that position by the locking means until released as will be hereinafter fully described.

The member 3 has depending posts 16 carrying an apertured support 17 on which is mounted a disc 18 herein shown with an annular depending flange, said disc having a depending internally threaded sleeve 19 extending through the opening of the support 17 and in which is mounted the external threaded upper end of a stem 20 on which is slidably mounted a pendulum 21, the sliding movement of the pendulum on the stem being limited by a screw 22 working in an annular reduced portion 23 of the stem as clearly shown in Figure 3.

The bottom of the pendulum is struck on the arc of a circle and is adapted to seat on a frictional pad 24 carried by a concaved seat 25 loosely mounted on adjusting screw 26 arranged in the horizontally disposed portions of the sections 1 and 2 of the bracket, said screw being locked in its adjusted position by lock nut 27. The seat 25 is preferably provided with an annular flange which forms an annular rest on which the curved lower end of the pendulum 21 is adapted to rest.

The disc 18 is centrally apertured, the walls of the aperture being cut away as shown at 28 and extending through this aperture is a threaded stem 29 which carries a ball 30 at its lower end which is adapted to cooperate with the cup-shaped portion 20' of the stem 20. The stem 29 works in a threaded bore formed in a locking pin 31 which is mounted in an enlarged apertured portion 3' of the member 3 and a plate 32, the upper end of the stem 29 being provided with a slot 29' for adjusting the stem within the locking pin 31, a suitable lock nut 33 being provided for locking the stem in adjusted position within the pin.

By adjusting the stem 20 within the sleeve 19, the desired lost motion can be obtained so as to allow the pendulum to move slightly in any direction. By adjusting the threaded stem 29 within the pin 31, the device can be made as sensitive as desired.

The pin 31 is adapted to work through a slot 34 formed in the member 5, said slot being enlarged at one end as shown at 35, the pin 31 being annularly reduced as shown at 36, the diameter of the reduced portion being slightly less than the width of the slot 34 so that the spring-actuated member 5 can slide freely over the reduced portion of the pin and the diameter of the pin above the reduced portion is slightly less than the diameter of the circular portion 35 of the spring-actuated member whereby the pin is forced upwardly by the swinging of the pendulum, the reduced portion will be brought into alignment with the slot 34 so as to release the spring-actuated member and cause the same to move in one direction by the action of the spring. A stop 31' is provided for limiting the upward movement of the pin.

With the device in the position as shown in Figure 3, when a sudden shock or abnormal tilting of the vehicle occurs or the turning over of the vehicle, the pendulum is unseated and swings on the edge of the disc 18 as a fulcrum in order to provide the proper leverage to force the pin 31 upwardly to release the spring-actuated member 5. This is illustrated in Figure 4 and as the pendulum is free to swing in all directions, it will follow that the fulcrum point of the pendulum will be on the opposite edge of the disc from which the pendulum moves so that when any unusual position is assumed by the vehicle, the pendulum swings and the pin will be disengaged from the spring-actuated member to release the spring-actuated member. This provides a construction in which the weight of the pendulum can be greatly reduced as the proper leverage is obtained through the medium of the disc 18 so as to force the pin in position to release the member 5 against the pressure of the spring acting thereon. This construction operates the release pin of the spring-actuated member when the device is subjected to a shock or is tilted abnormally or is turned completely over. As the spring-actuated member is released by the abnormal tilting or abnormal shock, I am able to utilize this spring-actuated member to cut off the electrical energy and the fuel supply to the engine.

Referring to Figure 1, 37 is the fuel supply pipe leading from a source of supply to the charge forming device of the internal combustion engine and disposed within this fuel line is a valve 38 provided with a handle 39 adapted to extend into the enlarged bifurcated end 40 of the shaft 8 so that when the spring-actuated member is released, the shaft 8 is oscillated to turn the valve into closed position so as to cut off the supply of fuel passing therethrough. As this shaft is also used to reset the spring-actuated member the valve will be opened when the spring-actuated member is returned to set position.

In order to cut off the supply of electrical energy from the source of supply to the internal combustion engine, I have shown a pair of leads 41 and 42 extending to a pair of spring contacts 43 and 44 which are adapted to be bridged by pin 45 carried by spring-actuated member 5 and as the circuit is completed when the device is set, when the spring-actuated member is tripped, the pin is drawn from between the spring contacts 43 and 44 and breaks the circuit so as to cut off the supply of electrical energy to the internal combustion engine.

While I have shown a particular form of switch which is built into the device, it is, of course, understood that this switch can be located at any point from the source of supply of electrical energy to the distributor of the electrical ignition system of the engine so that through the medium of cables, links, rods or the like it can be operated from a remote position to absolutely cut off the supply of electrical energy at the battery to prevent the vehicle from catching on fire after an accident.

While in the drawings I have shown the valve in the fuel supply located adjacent the device, it is, of course, understood that this valve can be located at any desired point and connected to the spring-actuated member through the medium of cables, links, rods or the like and operated from a remote position as my invention consists broadly in storing up energy which is released to operate a switch and a valve controlling the supply of electrical energy and the supply of fuel to the internal combustion engine and therefore I do not wish to limit myself to the positioning of the switch and valve at any particular point in the installation of my improved construction of safety device. The most practical position for the switch and valve is at the source of supply, namely, the battery and the fuel tank.

In order to provide means for locking the pendulum in position on its seat to prevent the same from moving in any way when the device is used on an airplane and the aviator is stunt flying, and to positively reset the pendulum and reset the device, I slidably mount on the rod 15³ a tubular operating member 46 which extends through the instrument board 47 and is provided with a handle 48 for reciprocating and oscillating the same on the tube for the purpose hereinafter fully described. The operating member has a coil spring 49 disposed therein, which normally holds the member extended as shown in Figure 2 and when pushed inwardly, the operator engages the sleeve 15 so as to move the same and lock the arm 14 to reset the device after it has been tripped. The sleeve 15 when the device is set is in the position shown in Figures 1 and 2 placed from the end of the tubular operating arm 46 a sufficient distance to allow it to be moved by the swinging of the arm 14 when the device is tripped.

In order to reset the device irrespective of the position the vehicle has assumed in tripping of the device and to provide means for locking the device in locked position so that it is impossible to trip the same to allow the device to be used on an airplane when stunt flying, I provide a horizontally disposed portion of the section 2 with a bracket with a vertically disposed hollow part 50 in which is slidably mounted a plunger 51 normally held in raised position against the stop 52 by a spring 53 disposed in the hollow post as clearly shown in Figure 1.

The plunger is provided with a head 54 carrying a lateral arm 55 terminating in a ring portion 56 surrounding the stem 20 of the pendulum 21 and adapted to engage a conical member 21' carried thereby for returning and forcing the pendulum on its seat when the arm is moved downwardly. The arm is normally held in raised position by the spring which allows the pendulum to swing freely to trip the device and when forced downwardly it is held reset and locked and locks the device.

The head 54 is provided with a lateral shoulder 57 having a beveled under face which is adapted to engage the head 58 carried by a vertically disposed flat spring 59 and ride into a notch 60 formed in the head when forced downwardly in order to lock the head in its lower position.

The operating member 46 carries an arm 61 which engages an apertured ear 62 surrounding the member 46 which limits the upward movement of the member. The ear 62 is carried by a bracket 62' supported on the section 2 of the bracket and as the arm 61 is provided with a tail portion 61' the operating member is prevented from being turned when in an extended position as shown in Figures 1 and 2.

The arm 61 is adapted to engage the shoulder 57 when the operating member is pushed and oscillated to force the head downwardly so that it will be locked when engaged by the head of the spring 59.

In order to unlock the device, the arm 61 is provided with a notch 61² in its end which is beveled and adapted to engage a pin 58' of the head 58 so that when said arm is swung upwardly by the oscillation of the operating member, the head will be moved out of engagement with the shoulder and allow the locking device to move upwardly out of engagement with the conical member 21'. This construction also locks the arm 61 in its lower position when it has been moved downwardly to lock the device. If the vehicle is in a horizontal plane, it is only necessary to push the operating member inwardly to reset the device and when the vehicle is tilted, by pushing the operating member inwardly and turning the same, the pendulum will be returned to its seat.

In the operation of the device constructed as herein shown and described, when the device is in a perfectly level position and is in a set position, the enlarged portion of the pin is in the enlarged portion of the slot of the spring-actuated member so as to hold the spring-actuated member set. This is accomplished by just simply pushing in and oscillating the operating member 46 when the device has been tripped and the lower end of the pendulum when the device is tripped is in a plane above its seat and when the member is operated to allow the pin to drop down, the pendulum drops into the seat so that it is only necessary in resetting the device to push inwardly and oscillate the operating member. When the device is subjected to an abnormal tilting or turning over or abnormal shock, the pendulum swings off its seat and as it swings, one edge of the disc is brought into engagement with the support, which edge acts as a fulcrum and forces the pin upwardly to bring the reduced portion into alignment with the slot of the spring-actuated member so as to release the spring-actuated member. The movement of the spring-actuated member when released breaks the circuit and cuts off the valve so that in case of an accident, the fuel supply and electrical energy will be instantaneously cut off so as to prevent the vehicle from catching on fire.

In the construction herein shown, the pendulum is slidably mounted on the stem in order to enable it to ride off the curved seat when subjected to an abnormal shock or the tilting of the device and when in set position the entire weight of the pendulum is on its seat so as to release the strain of the trip pin whereby a construction is provided which prevents the same from operating until subjected to an abnormal position or shock.

While in the drawings I have shown certain details of construction, I wish it to be clearly understood that my invention consists broadly in storing up energy of a member, which member is released by the swinging of a pendulum so that the energy of the member can be utilized to cut off the fuel supply and the electrical energy and therefore I do not wish to limit myself to any particular manner of mounting and arranging these various parts as I am aware that various changes can be made without departing from the spirit of my invention.

In the drawings I have illustrated a safety device in which the switch and valve and resetting and locking device are built in a single unit but I wish it to be clearly understood that my device consists broadly in storing up energy in a spring-actuated member for operating a switch or a valve at a remote position through the medium of links, levers, rods and the like and that the resetting and operating device can be locked at a remote position from the device itself and therefore I do not wish to limit myself to the particular means of resetting and locking the device.

While in the drawings and specification, I have described a safety device constructed in a particular manner, it is understood that my invention consists broadly in providing means for tripping a spring-actuated member through the medium of a movably mounted weight so that the device will be operated when the vehicle assumes an abnormal position.

What I claim is:

1. A safety device of the kind described comprising a movably mounted plate, a shaft carrying means cooperating with said plate for reciprocating said plate, a spring for oscillating said shaft, a pin cooperating with said plate for holding said plate in set position against the action of said spring, a support, a pendulum carrying a disc adapted to cooperate with the support and a connection between said pendulum and said pin.

2. A safety device of the kind described comprising a movably mounted plate, a shaft having an arm for reciprocating said plate, a lever for oscillating said shaft, an arm carried by said shaft having a coil spring connected thereto for oscillating said shaft, a pin cooperating with said plate for holding said plate against the action of said spring and a pendulum having an adjustable connection with said pin.

3. A safety device of the kind described comprising a movably mounted plate, a shaft having an arm for reciprocating said plate, a spring for oscillating said shaft, a pin for locking said plate against the action of said spring, a pendulum for actuating said pin and means for resetting and locking said pendulum in normal position.

4. A safety device of the kind described having a spring-actuated member, a pin for holding said member against the action of said spring, a pendulum having a universal movement at its upper end and a sliding movement at its lower end, a seat for said pendulum, a connection between said pendulum and pin and means for locking said pendulum on its seat.

5. A safety device of the kind described comprising a spring actuated plate, a pin for holding said plate against the action of said spring, a support, a pendulum having a disc adapted to cooperate with said support, a connection between said pendulum and pin and a rocking seat for the lower end of said pendulum.

6. A safety device of the kind described comprising a spring actuated plate, a pin for holding said plate against the action of said spring, a support, a pendulum having a disc adapted to cooperate with said support, a connection between said pendulum and pin, a rocking seat for the lower end of said pendulum and means for resetting said plate and locking said pendulum on its seat.

7. A safety device of the kind described comprising a spring-actuated plate, a pin for holding said plate against the action of said spring, a support, a pendulum having a disc adapted to cooperate with said support for moving said pin out of engagement with said plate and a seat for said pendulum.

8. A safety device of the kind described comprising a spring-actuated plate, a pin for locking said plate against action of said spring, a pendulum arranged to swing in all directions, a connection between said pendulum and pin and a seat for said pendulum.

9. A device of the kind described comprising a spring-actuated plate having a slot with an enlargement at one end, a pin having an annular recess extending through said slot, a support, a pendulum having a disc at its upper end adapted to cooperate with said support, a connection between said pendulum and pin and an adjustable seat for said pendulum.

10. A safety device for internal combustion engine driven vehicles having a spring-actuated plate for cutting off the supply of electrical energy and supply of fuel to the engine, a pin for locking said plate against the action of said spring, an apertured support, a pendulum mounted upon a stem, a connection between said pendulum and said pin and a disc carried by said pendulum adapted to cooperate with said support to form a fulcrum for said pendulum when moved out of a vertical plane.

11. A safety device of the kind described, comprising a movably mounted member, means for moving said member in one direction, a spring for moving said member in the reverse direction, means for locking said movable member against the action of the spring, a pendulum stem mounted to swing in all directions, means operated by the swinging of said pendulum stem to release said locking means, a weight slidably mounted on said pendulum stem, and a seat for said weight for holding said pendulum in its normal position.

12. A safety device of the kind described, comprising a movably mounted member, means for moving said member in one direction, a spring for moving said member in the reverse direction, means for locking said movable member against the action of the spring, a pendulum stem mounted to swing in all directions, means operated by the swinging of said pendulum stem to release said locking means, a weight slidably mounted on said pendulum stem, a seat for said weight for holding said pendulum in its normal position, and an arm adapted to engage said weight for locking said weight on its seat.

13. A safety device of the kind described, comprising a movably mounted member, means for moving said member in one direction, a spring for moving said member in the reverse direction, means for locking said movable member against the action of the spring, a pendulum stem mounted to swing in all directions, means operated by the swinging of said pendulum stem to release said locking means, a weight slidably mounted on said pendulum stem, a seat for said weight for holding said pendulum in its normal position, a ring surrounding said pendulum stem engaging said weight, and means for raising and lowering said ring to reset and lock said weight on its seat.

EDWARD R. NEEPER.